United States Patent
Swaminathan et al.

(10) Patent No.: US 12,189,688 B2
(45) Date of Patent: Jan. 7, 2025

(54) FAST EXPLORATION AND LEARNING OF LATENT GRAPH MODELS

(71) Applicant: DeepMind Technologies Limited, London (GB)

(72) Inventors: Sivaramakrishnan Swaminathan, Mountain View, CA (US); Meet Kirankumar Dave, Santa Clara, CA (US); Miguel Lazaro-Gredilla, Union City, CA (US); Dileep George, Sunnyvale, CA (US)

(73) Assignee: DeepMind Technologies Limited, London (GB)

( * ) Notice: Subject to any disclaimer, the term of this patent is extended or adjusted under 35 U.S.C. 154(b) by 0 days.

(21) Appl. No.: 18/373,870

(22) Filed: Sep. 27, 2023

(65) Prior Publication Data

US 2024/0126812 A1    Apr. 18, 2024

Related U.S. Application Data

(60) Provisional application No. 63/436,845, filed on Jan. 3, 2023, provisional application No. 63/411,031, filed on Sep. 28, 2022.

(51) Int. Cl.
  *G06F 16/901* (2019.01)
  *G06F 17/12* (2006.01)

(52) U.S. Cl.
  CPC .......... *G06F 16/9024* (2019.01); *G06F 17/12* (2013.01)

(58) Field of Classification Search
  CPC ........................... G06F 16/9024; G06F 17/12
  See application file for complete search history.

(56) References Cited

U.S. PATENT DOCUMENTS

| | | | |
|---|---|---|---|
| 2022/0366246 A1* | 11/2022 | Danihelka | G06N 3/08 |
| 2023/0073326 A1* | 3/2023 | Schrittwieser | G06F 18/214 |

OTHER PUBLICATIONS

Amin et al., "A survey of exploration methods in reinforcement learning," CoRR, submitted on Sep. 2, 2021, arXiv:2109.00157v2, 79 pages.

(Continued)

*Primary Examiner* — Apu M Mofiz
*Assistant Examiner* — Oscar Wehovz
(74) *Attorney, Agent, or Firm* — Fish & Richardson P.C.

(57) ABSTRACT

Methods, systems, and apparatus, including computer programs encoded on computer storage media, for generating a graph model representing an environment being interacted with by an agent. In one aspect, one of the methods include: obtaining experience data; using the experience data to update a visitation count for each of one or more state-action pairs represented by the graph model; and at each of multiple environment exploration steps: computing a utility measure for each of the one or more state-action pairs represented by the graph model; determining, based on the utility measures, a sequence of one or more planned actions that have an information gain that satisfies a threshold; and controlling the agent to perform the sequence of one or more planned actions to cause the environment to transition from a state characterized by a last observation received after a last action in the experience data into a different state.

20 Claims, 7 Drawing Sheets

(56) References Cited

OTHER PUBLICATIONS

Battaglia et al., "Relational inductive biases, deep learning, and graph networks," CoRR, submitted on Oct. 17, 2018, arXiv:1806.01261v3, 40 pages.

Beattie et al., "DeepMind lab," CoRR, submitted on Dec. 13, 2016, arXiv:1612.03801v2, 11 pages.

Bellemare et al., "Unifying Count-Based exploration and intrinsic motivation," CoRR, submitted on Nov. 7, 2016, arXiv:1606.01868v2, 20 pages.

Brafman et al., "Resolving perceptual aliasing in the presence of noisy sensors," Advances in neural information processing systems, 2004, 8 pages.

Buhai et al., "Empirical study of the benefits of overparameterization in learning latent variable models" In International Conference on Machine Learning, Nov. 21, 2020, p. 1211-1219.

Cassandra et al., "Acting optimally in partially observable stochastic domains," in AAAI 94, Jul. 31, 1994, p. 1023-1028.

Chandra et al., "The electrical resistance of a graph captures its commute and cover times," In Proceedings of the twenty-first annual ACM symposium on Theory of computing, Feb. 1, 1989, p. 574-586.

Chrisman, "Reinforcement learning with perceptual aliasing: The perceptual distinctions approach," in AAAI, Jul. 12, 1992, p. 183-188.

Dai et al., "Learning transferable graph exploration," Advances in Neural Information Processing Systems, Oct. 2019, 12 pages.

Dechter et al., "Bootstrap learning via modular concept discovery," In Proceedings of the international joint conference on artificial intelligence 2013, AAAI Press/International Joint Conferences on Artificial Intelligence, 2013, 9 pages.

Dong et al., " Learning graphs from data: A signal representation perspective," CoRR, submitted on May 20, 2019, arXiv:1806.00848v3, 38 pages.

Ecoffet et al., "First return, then explore," Nature, Feb. 24, 2021, 590(7847):580-586.

Forney et al., "Counterfactual data-fusion for online reinforcement learners," In International Conference on Machine Learning, Jul. 17, 2017, p. 1156-1164.

From Animals to Animats, Schmidhuber(ed)., 1991, A possibility for implementing curiosity and boredom in model-building neural controllers, 1 page (abstract only).

George et al., "Clone-structured graph representations enable flexible learning and vicarious evaluation of cognitive maps," Nature Communications, Apr. 2021, 12(1):2392, 17 pages.

Ghosh et al., "Why generalization in RL is difficult: Epistemic POMDPs and implicit partial observability," CoRR, submitted on Jul. 13, 2021, arXiv:2107.06277v1, 23 pages.

Groth et al., "Is curiosity all you need? on the utility of emergent behaviours from curious exploration," CoRR, submitted on Sep. 17, 2021, arXiv:2109.08603v1, 14 pages.

Guestrin et al., "Efficient solution algorithms for factored MDPs," Journal of Artificial Intelligence Research, Oct. 1, 2003, p. 399-468.

Kearns et al., "Near-Optimal reinforcement learning in polynomial time," Machine Learning, Nov. 2002, 49(2/3):209-232.

Kolter et al., "Near-Bayesian exploration in polynomial time," In Proceedings of the 26th Annual International Conference on Machine Learning, Jun. 14, 2009, p. 513-520.

Lajoie et al., "Modeling perceptual aliasing in SLAM via discrete-continuous graphical models," CoRR, submitted on Jan. 24, 2019, arXiv:1810.11692v3, 13 pages.

Lambiotte et al., "From networks to optimal higherorder models of complex systems," Nature Physics, 2019, 15(4):313-320 (abstract only).

Lehman et al., "Abandoning objectives: evolution through the search for novelty alone," Evolutionary Computation, Feb. 2011, 19(2): 189-223.

Meuleau et al., "Solving POMDPs by searching the space of finite policies," CoRR, Jan. 23, 2013, arXiv:1301.6720, 10 pages.

Motwani et al., "Randomized algorithms," ACM Compututer Surveys, Mar. 1, 1996, 28(1): 33-37.

Osband et al., "Deep exploration via bootstrapped DQN," CoRR, submitted on Jul. 4, 2016, arXiv:1602.04621v3, 18 pages.

Oudeyer et al., "What is intrinsic motivation? a typology of computational approaches," Frontiers in Neurorobotics, Nov. 2, 2007, 1:6, 14 pages.

Rabiner, "A tutorial on hidden markov models and selected applications in speech recognition," Proceedings of the IEEE, Feb. 1989, 77(2):257-286.

Rikhye et al., "Memorize-Generalize: An online algorithm for learning higher-order sequential structure with cloned hidden markov models," BioRxiv, Sep. 10, 2019, 4 pages.

Ritter et al., "Rapid task-solving in novel environments," CoRR, submitted on Apr. 19, 2021, arXiv:2006.03662v3, 15 pages.

Rosvall et al., "Maps of random walks on complex networks reveal community structure," Proceedings of the National Academy of Sciences of the United States of America, Jan. 2008, 105(4): 1118-1123.

Sharan et al., "Learning overcomplete HMMs," Advances in Neural Information Processing Systems, 2017, 10 pages.

Sharma et al., "Map induction: Compositional spatial submap learning for efficient exploration in novel environments," CoRR, submitted on Mar. 17, 2022, arXiv:2110.12301v2, 22 pages.

Shyam et al., "Model-based active exploration," In International conference on machine learning, May 24, 2019, p. 5779-5788.

Strehl et al., "A theoretical analysis of Model-Based interval estimation," In Proceedings of the 22nd international conference on Machine learning—ICML, Aug. 7, 2005, p. 856-863.

Strehl et al., "An analysis of model-based interval estimation for markov decision processes," Journal of Computer and System Sciences, Dec. 1, 2008, 74(8):1309-1331.

Tang et al., "#exploration: A study of Count-Based exploration for deep reinforcement learning," Advances in neural information processing systems, 2017, 10 pages.

Viterbi, "Error bounds for convolutional codes and an asymptotically optimum decoding algorithm," IEEE transactions on information theory I Professional Technical Group on Information Theory, Apr. 1967, 13(2):260-269.

Whitehead et al., "Learning to perceive and act by trial and error," Machine Learning, Jul. 1991, 7(1):45-83.

Wilf, "The white screen problem," The American mathematical monthly: the official journal of the Mathematical Association of America, Oct. 1, 1989, 96(8):704-707 (abstract only).

Xu et al., "Benefits of over-parameterization with EM," Advances in Neural Information Processing Systems, 2018, 11 pages.

Xu et al., "Representing higher-order dependencies in networks," Network Science, May 20, 2016, 2(5):e1600028.

Yang et al., "Exploration in deep reinforcement learning: a comprehensive survey," CoRR, submitted on Jan. 26, 2022, arXiv:2109.06668v3, 24 pages.

\* cited by examiner

FAST EXPLORATION AND LEARNING OF LATENT GRAPH MODELS

CROSS-REFERENCE TO RELATED APPLICATION

This application claims priority to U.S. Provisional Application Ser. No. 63/411,031, filed on Sep. 28, 2022, and U.S. Provisional Application Ser. No. 63/436,845, filed on Jan. 3, 2023. The disclosure of the prior applications are considered part of and are incorporated by reference in the disclosure of this application.

BACKGROUND

This specification relates to generating a cognitive map of an environment.

For example, the environment may be an environment being interacted with by an agent, and the cognitive map enables the agent to navigate effectively in the environment.

SUMMARY

This specification describes an agent control system implemented as computer programs on one or more computers in one or more locations that selects actions to be performed by an agent interacting with an environment. In particular, the agent control system uses a graph model in selecting actions to be performed in response to observations of the environment. The graph model is a latent representation of an environment that is generated by the system based on past interaction of the agent with the environment.

The subject matter described in this specification can be implemented in particular embodiments so as to realize one or more of the following advantages. A latent graph model of an environment that has a very large state space can be quickly and accurately generated through agent interaction with the environment. Advantageously, the latent graph model can be implemented as a Clone Structured Cognitive Graph (CSCG) which forms clones of an observation for different contexts to account for situations where multiple distinct states of the environment may be perceptually aliased to a same observation.

Unlike conventional techniques which generally involve the agent performing sequences of random actions when interacting with the environment, the techniques described in this specification performs multiple iterations of an environment exploration step to effectively search through the environment.

In particular, at each iteration of the environment exploration step, the techniques described in this specification maintain a utility measure for each of multiple state-action pairs in the graph model that can be computed by evaluating a closed form utility function, and subsequently uses the utility measures to select a sequence of planned actions that satisfy a predetermined information gain threshold for the agent to perform. The possible states of the environment as well as action-conditioned transition probabilities between these states to be included in the latent graph model can thus be determined with fewer amount of computing and energy resources and in a smaller amount of time.

By employing a latent graph model generated as described in this specification, an agent can be controlled to achieve better performance on various kinds of agent control tasks because actions that would lead to higher task rewards or quicker achievement of task goals can be more accurately determined through planning by virtue of the learned latent representation of the environment.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
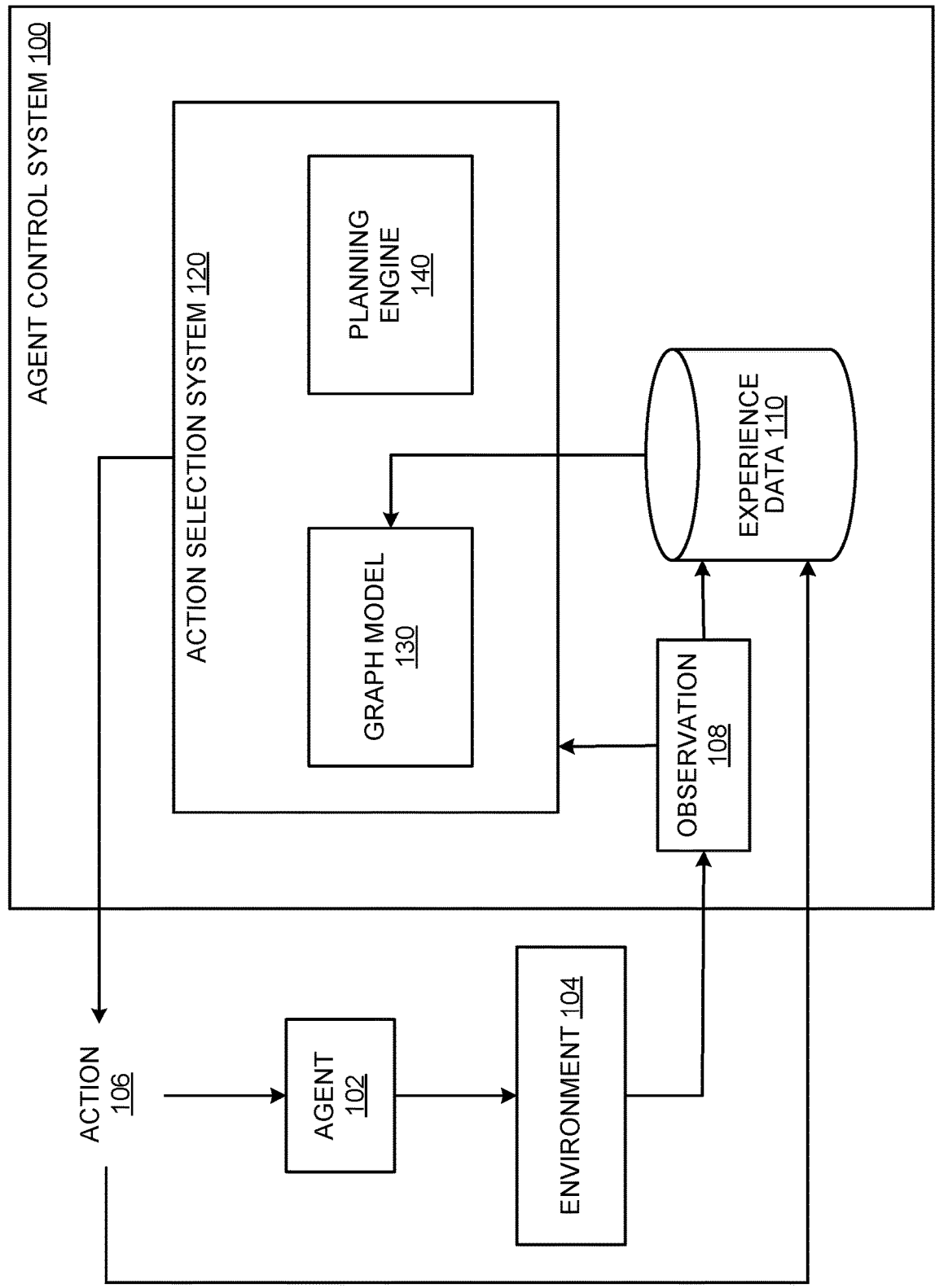
FIG. 1 shows an example agent control system.

This specification describes an agent control system implemented as computer programs on one or more computers in one or more locations that controls an agent to interact with an environment by, at any given time step, causing the agent to perform an action selected using a graph model and an observation that characterizes the state of the environment at the given time step.

In some implementations, the environment is a real-world environment, the agent is a mechanical agent interacting with the real-world environment, e.g., a robot or an autonomous or semi-autonomous land, air, or sea vehicle operating in or navigating through the environment, and the actions are actions taken by the mechanical agent in the real-world environment to perform the task. For example, the agent may be a robot interacting with the environment to accomplish a specific task, e.g., to locate an object of interest in the environment or to move an object of interest to a specified location in the environment or to navigate to a specified destination in the environment.

In these implementations, the observations may include, e.g., one or more of: images, object position data, and sensor data to capture observations as the agent interacts with the environment, for example sensor data from an image, distance, or position sensor or from an actuator. For example in the case of a robot, the observations may include data characterizing the current state of the robot, e.g., one or more of: joint position, joint velocity, joint force, torque or acceleration, e.g., gravity-compensated torque feedback, and global or relative pose of an item held by the robot. In the case of a robot or other mechanical agent or vehicle the observations may similarly include one or more of the position, linear or angular velocity, force, torque or acceleration, and global or relative pose of one or more parts of the agent. The observations may be defined in 1, 2 or 3 dimensions, and may be absolute and/or relative observations. The observations may also include, for example, sensed electronic signals such as motor current or a temperature signal; and/or image or video data for example from a camera or a LIDAR sensor, e.g., data from sensors of the agent or data from sensors that are located separately from the agent in the environment.

In these implementations, the actions may be control signals to control the robot or other mechanical agent, e.g., torques for the joints of the robot or higher-level control commands, or the autonomous or semi-autonomous land, air, sea vehicle, e.g., torques to the control surface or other control elements e.g. steering control elements of the vehicle, or higher-level control commands. The control signals can include for example, position, velocity, or force/torque/acceleration data for one or more joints of a robot or parts of another mechanical agent. The control signals may also or instead include electronic control data such as motor control data, or more generally data for controlling one or more electronic devices within the environment the control of which has an effect on the observed state of the environment. For example in the case of an autonomous or semi-autonomous land or air or sea vehicle the control signals may define actions to control navigation e.g. steering, and movement e.g., braking and/or acceleration of the vehicle.

In some implementations the environment is a simulation of the above-described real-world environment, and the agent is implemented as one or more computers interacting with the simulated environment. For example the simulated environment may be a simulation of a robot or vehicle and the system may be trained on the simulation and then, once trained, used in the real-world.

In some implementations the environment is a real-world manufacturing environment for manufacturing a product, such as a chemical, biological, or mechanical product, or a food product. As used herein a "manufacturing" a product also includes refining a starting material to create a product, or treating a starting material e.g. to remove pollutants, to generate a cleaned or recycled product. The manufacturing plant may comprise a plurality of manufacturing units such as vessels for chemical or biological substances, or machines, e.g. robots, for processing solid or other materials. The manufacturing units are configured such that an intermediate version or component of the product is moveable between the manufacturing units during manufacture of the product, e.g. via pipes or mechanical conveyance. As used herein manufacture of a product also includes manufacture of a food product by a kitchen robot.

The agent may comprise an electronic agent configured to control a manufacturing unit, or a machine such as a robot, that operates to manufacture the product. That is, the agent may comprise a control system configured to control the manufacture of the chemical, biological, or mechanical product. For example the agent control system may be configured to control one or more of the manufacturing units or machines or to control movement of an intermediate version or component of the product between the manufacturing units or machines.

As one example, a task performed by the agent may comprise a task to manufacture the product or an intermediate version or component thereof. As another example, a task performed by the agent may comprise a task to control, e.g. minimize, use of a resource such as a task to control electrical power consumption, or water consumption, or the consumption of any material or consumable used in the manufacturing process.

The actions may comprise control actions to control the use of a machine or a manufacturing unit for processing a solid or liquid material to manufacture the product, or an intermediate or component thereof, or to control movement of an intermediate version or component of the product within the manufacturing environment e.g. between the manufacturing units or machines. In general the actions may be any actions that have an effect on the observed state of the environment, e.g. actions configured to adjust any of the sensed parameters described below. These may include actions to adjust the physical or chemical conditions of a manufacturing unit, or actions to control the movement of mechanical parts of a machine or joints of a robot. The actions may include actions imposing operating conditions on a manufacturing unit or machine, or actions that result in changes to settings to adjust, control, or switch on or off the operation of a manufacturing unit or machine.

In response to each of some or all of the performed actions, the agent receives a reward or a return. The rewards or return may be numeric values that relate to a metric of performance of the task. For example in the case of a task that is to manufacture a product the metric may comprise a metric of a quantity of the product that is manufactured, a quality of the product, a speed of production of the product, or to a physical cost of performing the manufacturing task, e.g. a metric of a quantity of energy, materials, or other resources, used to perform the task. In the case of a task that is to control use a resource the matric may comprise any metric of usage of the resource.

In general observations of a state of the environment may comprise any electronic signals representing the functioning of electronic and/or mechanical items of equipment. For example a representation of the state of the environment may be derived from observations made by sensors sensing a state of the manufacturing environment, e.g. sensors sensing a state or configuration of the manufacturing units or machines, or sensors sensing movement of material between the manufacturing units or machines. As some examples such sensors may be configured to sense mechanical movement or force, pressure, temperature; electrical conditions such as current, voltage, frequency, impedance; quantity, level, flow/movement rate or flow/movement path of one or more materials; physical or chemical conditions e.g. a physical state, shape or configuration or a chemical state such as pH; configurations of the units or machines such as the mechanical configuration of a unit or machine, or valve configurations; image or video sensors to capture image or video observations of the manufacturing units or of the machines or movement; or any other appropriate type of sensor. In the case of a machine such as a robot the observations from the sensors may include observations of position, linear or angular velocity, force, torque or acceleration, or pose of one or more parts of the machine, e.g. data characterizing the current state of the machine or robot or of an item held or processed by the machine or robot. The observations may also include, for example, sensed electronic signals such as motor current or a temperature signal, or image or video data for example from a camera or a LIDAR sensor. Sensors such as these may be part of or located separately from the agent in the environment.

In some implementations the environment is the real-world environment of a service facility comprising a plurality of items of electronic equipment, such as a server farm or data center, for example a telecommunications data center, or a computer data center for storing or processing data, or any service facility. The service facility may also include ancillary control equipment that controls an operating environment of the items of equipment, for example environmental control equipment such as temperature control e.g. cooling equipment, or air flow control or air conditioning equipment. The task may comprise a task to control, e.g. minimize, use of a resource, such as a task to control electrical power consumption, or water consumption. The agent may comprise an electronic agent configured to control operation of the items of equipment, or to control operation of the ancillary, e.g. environmental, control equipment.

In general the actions may be any actions that have an effect on the observed state of the environment, e.g. actions configured to adjust any of the sensed parameters described below. These may include actions to control, or to impose operating conditions on, the items of equipment or the ancillary control equipment, e.g. actions that result in changes to settings to adjust, control, or switch on or off the operation of an item of equipment or an item of ancillary control equipment.

In general observations of a state of the environment may comprise any electronic signals representing the functioning of the facility or of equipment in the facility. For example a representation of the state of the environment may be derived from observations made by any sensors sensing a state of a physical environment of the facility or observations made by any sensors sensing a state of one or more of items of equipment or one or more items of ancillary control equipment. These include sensors configured to sense electrical conditions such as current, voltage, power or energy; a temperature of the facility; fluid flow, temperature or pressure within the facility or within a cooling system of the facility; or a physical facility configuration such as whether or not a vent is open.

The rewards or return may relate to a metric of performance of the task. For example in the case of a task to control, e.g. minimize, use of a resource, such as a task to control use of electrical power or water, the metric may comprise any metric of use of the resource.

In some implementations the environment is the real-world environment of a power generation facility e.g. a renewable power generation facility such as a solar farm or wind farm. The task may comprise a control task to control power generated by the facility, e.g. to control the delivery of electrical power to a power distribution grid, e.g. to meet demand or to reduce the risk of a mismatch between elements of the grid, or to maximize power generated by the facility. The agent may comprise an electronic agent configured to control the generation of electrical power by the facility or the coupling of generated electrical power into the grid. The actions may comprise actions to control an electrical or mechanical configuration of an electrical power generator such as the electrical or mechanical configuration of one or more renewable power generating elements e.g. to control a configuration of a wind turbine or of a solar panel or panels or mirror, or the electrical or mechanical configuration of a rotating electrical power generation machine. Mechanical control actions may, for example, comprise actions that control the conversion of an energy input to an electrical energy output, e.g. an efficiency of the conversion or a degree of coupling of the energy input to the electrical energy output. Electrical control actions may, for example, comprise actions that control one or more of a voltage, current, frequency or phase of electrical power generated.

The rewards or return may relate to a metric of performance of the task. For example in the case of a task to control the delivery of electrical power to the power distribution grid the metric may relate to a measure of power transferred, or to a measure of an electrical mismatch between the power generation facility and the grid such as a voltage, current, frequency or phase mismatch, or to a measure of electrical power or energy loss in the power generation facility. In the case of a task to maximize the delivery of electrical power to the power distribution grid the metric may relate to a measure of electrical power or energy transferred to the grid, or to a measure of electrical power or energy loss in the power generation facility.

In general observations of a state of the environment may comprise any electronic signals representing the electrical or mechanical functioning of power generation equipment in the power generation facility. For example a representation of the state of the environment may be derived from observations made by any sensors sensing a physical or electrical state of equipment in the power generation facility that is generating electrical power, or the physical environment of such equipment, or a condition of ancillary equipment supporting power generation equipment. Such sensors may include sensors configured to sense electrical conditions of the equipment such as current, voltage, power or energy; temperature or cooling of the physical environment; fluid flow; or a physical configuration of the equipment; and observations of an electrical condition of the grid e.g. from local or remote sensors. Observations of a state of the environment may also comprise one or more predictions regarding future conditions of operation of the power generation equipment such as predictions of future wind levels or solar irradiance or predictions of a future electrical condition of the grid.

As another example, the environment may be a chemical synthesis or protein folding environment such that each state is a respective state of a protein chain or of one or more intermediates or precursor chemicals and the agent is a computer system for determining how to fold the protein chain or synthesize the chemical. In this example, the actions are possible folding actions for folding the protein chain or actions for assembling precursor chemicals/intermediates and the result to be achieved may include, e.g., folding the protein so that the protein is stable and so that it achieves a particular biological function or providing a valid synthetic route for the chemical. As another example, the agent may be a mechanical agent that performs or controls the protein folding actions or chemical synthesis steps selected by the system automatically without human interaction. The observations may comprise direct or indirect observations of a state of the protein or chemical/intermediates/precursors and/or may be derived from simulation.

In a similar way the environment may be a drug design environment such that each state is a respective state of a potential pharmachemical drug and the agent is a computer system for determining elements of the pharmachemical drug and/or a synthetic pathway for the pharmachemical drug. The drug/synthesis may be designed based on a reward derived from a target for the drug, for example in simulation. As another example, the agent may be a mechanical agent that performs or controls synthesis of the drug.

In some further applications, the environment is a real-world environment and the agent manages distribution of tasks across computing resources e.g. on a mobile device and/or in a data center. In these implementations, the actions may include assigning tasks to particular computing resources.

As further example, the actions may include presenting advertisements, the observations may include advertisement impressions or a click-through count or rate, and the reward may characterize previous selections of items or content taken by one or more users.

In some cases, the observations may include textual or spoken instructions provided to the agent by a third-party (e.g., an operator of the agent). For example, the agent may be an autonomous vehicle, and a user of the autonomous vehicle may provide textual or spoken instructions to the agent (e.g., to navigate to a particular location).

As another example the environment may be an electrical, mechanical or electro-mechanical design environment, e.g. an environment in which the design of an electrical, mechanical or electro-mechanical entity is simulated. The simulated environment may be a simulation of a real-world environment in which the entity is intended to work. The task may be to design the entity. The observations may comprise observations that characterize the entity, i.e. observations of a mechanical shape or of an electrical, mechanical, or electro-mechanical configuration of the entity, or observations of parameters or properties of the entity. The actions may comprise actions that modify the entity e.g. that modify one or more of the observations. The rewards or return may comprise one or more metric of performance of the design of the entity. For example rewards or return may relate to one or more physical characteristics of the entity such as weight or strength or to one or more electrical characteristics of the entity such as a measure of efficiency at performing a particular function for which the entity is designed. The design process may include outputting the design for manufacture, e.g. in the form of computer executable instructions for manufacturing the entity. The process may include making the entity according to the design. Thus a design of an entity may be optimized, e.g. by reinforcement learning, and then the optimized design output for manufacturing the entity, e.g. as computer executable instructions; an entity with the optimized design may then be manufactured.

As previously described the environment may be a simulated environment. Generally in the case of a simulated environment the observations may include simulated versions of one or more of the previously described observations or types of observations and the actions may include simulated versions of one or more of the previously described actions or types of actions. For example the simulated environment may be a motion simulation environment, e.g., a driving simulation or a flight simulation, and the agent may be a simulated vehicle navigating through the motion simulation. In these implementations, the actions may be control inputs to control the simulated user or simulated vehicle. Generally the agent may be implemented as one or more computers interacting with the simulated environment.

The simulated environment may be a simulation of a particular real-world environment and agent. For example, the system may be used to select actions in the simulated environment during training or evaluation of the system and, after training, or evaluation, or both, are complete, may be deployed for controlling a real-world agent in the particular real-world environment that was the subject of the simulation. This can avoid unnecessary wear and tear on and damage to the real-world environment or real-world agent and can allow the control neural network to be trained and evaluated on situations that occur rarely or are difficult or unsafe to re-create in the real-world environment. For example the system may be partly trained using a simulation of a mechanical agent in a simulation of a particular real-world environment, and afterwards deployed to control the real mechanical agent in the particular real-world environment. Thus in such cases the observations of the simulated environment relate to the real-world environment, and the selected actions in the simulated environment relate to actions to be performed by the mechanical agent in the real-world environment.

Optionally, in any of the above implementations, the observation at any given time step may include data from a previous time step that may be beneficial in characterizing the environment, e.g., the action performed at the previous time step, the reward received at the previous time step, or both.

FIG. 1 shows an example control system 100. The control system 100 is an example of a system implemented as computer programs on one or more computers in one or more locations in which the systems, components, and techniques described below are implemented.

The control system 100 controls an agent 102 interacting with an environment 104 by, at each of multiple time steps, processing data characterizing the current state of the environment 104 at the time step (i.e., a current "observation" 108) and using an action selection system 120 to select an action 106 to be performed by the agent 102, and then causing the agent 102 to perform the selected action 106. Performance of the selected actions 106 by the agent 102 generally causes the environment 104 to transition into new states.

The action selection system 120 includes a graph model 130 and a planning engine 140. To select an action 106 to be performed by the agent 102 at a given time step, the planning engine 140 uses the graph model 130 to perform a plurality of planning iterations to generate plan data, and then selects the action 106 to be performed by the agent 102 in response to the current observation 108 received in the given time step based on the plan data. The plan data generally includes the results of each planning iteration, e.g., can be indicative of an estimated total reward to be received by the agent in response to performing each of multiple actions from the possible set of actions in the environment 104 and starting from the current state of the environment 104 characterized by the current observation 108.

The planning engine 140 can be configured to execute any of a variety of graph planning algorithms using data made available by the graph model 130 to perform the plurality of planning iterations. It will be appreciated that graph planning is usually more efficient (e.g., in terms of time, computing resources, or both) than other known planning techniques, e.g., planning through forward rollouts and Monte Carlo tree search (MCTS), that do not make use of an explicit graph model.

A few example graph planning algorithms that can be used by the planning engine 140 are descried in Anthony R Cassandra, et al. "Acting optimally in partially observable stochastic domains". In: Aaai. Vol. 94. 1994, pp. 1023-1028, and Nicolas Meuleau et al. "Solving POMDPs by searching the space of finite policies". In: arXiv preprint arXiv: 1301.6720 (2013).

The graph model 130, which may be viewed as a "cognitive map," is an internal representation of the environment 104 learned by the action selection system 120 that acts as a framework for planning further actions 106 that enable the agent 102 to learn the layout of environment 104, as well as to more effectively navigate within the environment 104 for higher task rewards or quicker achievement of task goals.

The graph model 130 includes nodes that represent states of the environment 104 (or another instance of the environment 104) and edges connecting the nodes. An edge between a first node and a second node in the graph model can represent a corresponding action performed by the agent which caused the environment to transition from a state represented by the first node into a state represented by the second node. The edge between the first node and the second node in the graph model is associated with an action-conditioned transition probability, which defines a likelihood of the state represented by the first state transitioning into the state represented by the second node, provided that the corresponding action represented by the edge is performed by the agent when the environment is in the state represented by the first node.

The graph model 130 in FIG. 1 can have any of a variety of different types. In some implementations, the graph model 130 is a lower-order graph model, e.g., a first-order hidden Markov model (HMM), where each node in the graph model corresponds to a hidden state of the Markov process. In these implementations, each of multiple possible states of the environment can correspond to a respective hidden state. The hidden state can be hidden during learning and inference and inferred using the learned HMM. The number of hidden states can be either known, or unknown. The hidden state can have a fixed, known, deterministic association with an observation that characterizes the environment state corresponding to the hidden state, where each hidden state is associated with a single observation.

In other implementations, the graph model 130 is a higher-order graph model, e.g., a cloned hidden Markov model (CHMM) or a clone structured cognitive graph (CSCG) model. As a particular example of such higher-order graph models which handles aliasing (where multiple distinct states of the environment may be perceptually aliased to a same observation), the CSCG model is described in more details in Dileep George, et al. Clone-structured graph representations enable flexible learning and vicarious evaluation of cognitive maps. Nature communications, 12(1): 2392, April 2021. ISSN 2041-1723. doi: 10.1038/s41467-021-22559-5, the entire contents of which are hereby incorporated by reference herein in their entirety. In this example, two or more nodes (in two or more clones) in the graph model 130 can correspond to a same hidden state, i.e., can represent a same observation of the environment.

Figure 2:
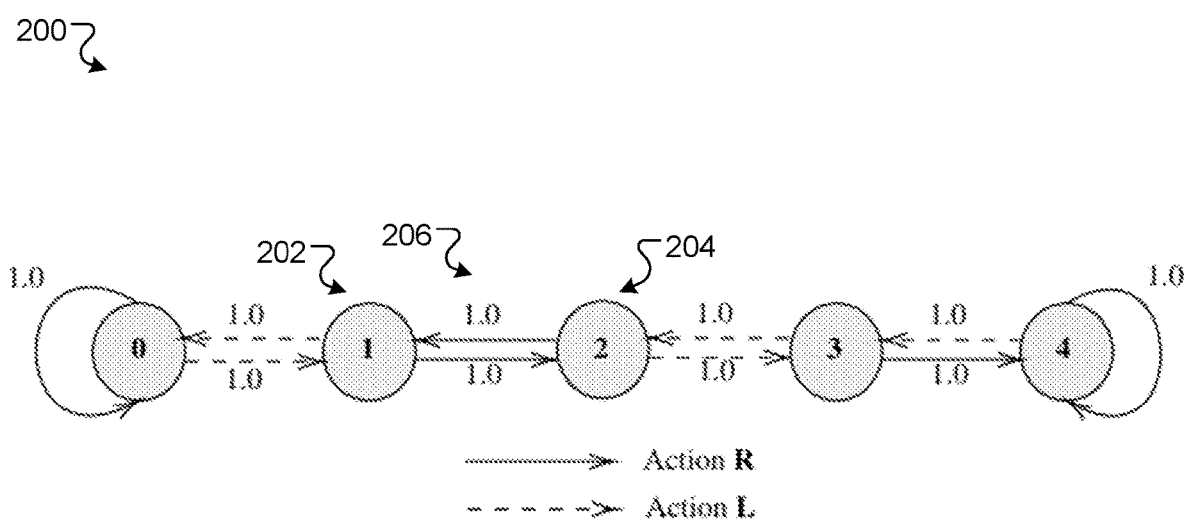
FIG. 2 is an example illustration of a graph model of an environment.

FIG. 2 is an example illustration of a graph model 200 of an environment. The environment in the example of FIG. 2 consists of a chain of five uniquely identifiable states {state 0, state 1, state 2, state 3, state 4}. Two possible actions {move left, move right} can be performed by the agent at each state—respectively causing the state to transition into the adjacent state on either side—except for the two terminal states at which one action {move right} can be performed by the agent that causes the terminal state to remain in the same state ("self-loop").

The graph model 200 is a first-order hidden Markov model (HMM). FIG. 2 thus illustrates that the graph model 200 includes fives nodes that represent the five distinct states of the environment, respectively, and edges connecting the nodes that represent the transitions between the states. For example, an edge 206 from node 204 to node 202 in the graph model 200 can represent a corresponding action {move right} performed by the agent which caused the environment to transition from state 2 (that is represented by the node 204) into state 1 (that is represented by the node 202).

FIG. 2 further illustrates that the edges are associated with action-conditioned transition probabilities. For example, FIG. 2 illustrates that the edge 206 is associated with an action-conditioned transition probability of 1.0 (although in principle it can be any number between 0 and 1, inclusive). The action-conditioned transition probability defines a likelihood of state 2 (that is represented by the node 204) transitioning into state 1 (that is represented by the node 202), provided that the corresponding action {move right} which is represented by the edge 206 is performed by the agent when the environment is in state 2.

The graph model 130 is generated by the agent control system 100 based on past interaction of the agent 102 with the environment 104. Generating (e.g., learning) the graph model 130 will be described further below, but in short, a learned graph model 130 is a model that includes nodes representing environment states that have been visited, and edges representing actions that have been performed, by the agent during the past interaction, where the edges are associated with learned action-conditioned transition probabilities.

Figure 3:
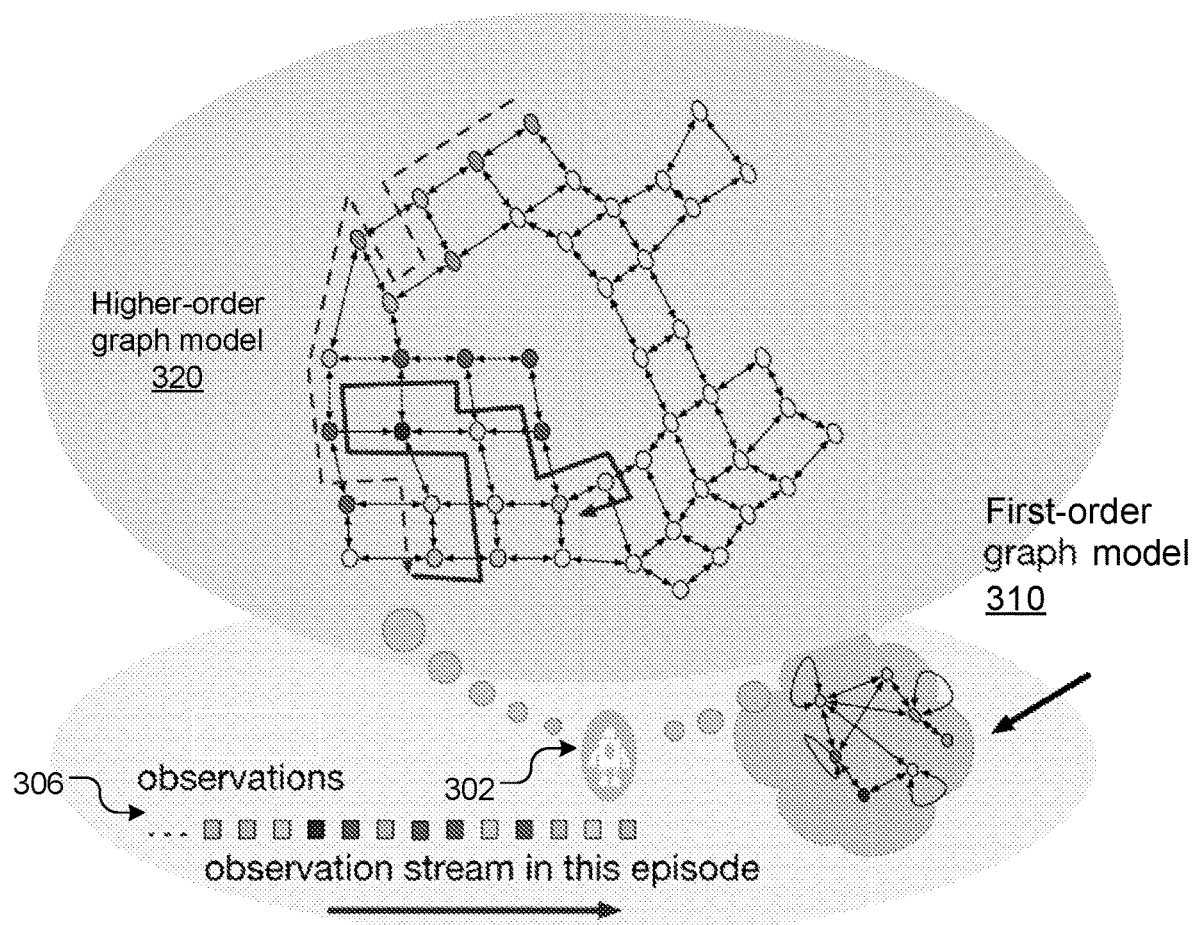
FIG. 3 is an example illustration of generating a graph model of an environment.

FIG. 3 is an example illustration of generating a graph model of an environment. As illustrated in FIG. 3, an agent 302 interacts with the environment by performing a sequence of actions selected from a possible set of actions, where each action is performed in response to one of a sequence of observations 306 received by the agent 302 during an episode of interaction with the environment.

At least two different types of graph model can be generated from the episode of interaction. FIG. 3 illustrates that the agent control system learns a first-order graph model 310. When learning the first-order graph model 310, the agent control system adds to the graph model a new node for every different observation that is received. Put another way, the agent control system adds no extra node for any new observation that is identical to a previously received observation. Thus the graph model includes multiple nodes, where each node can represent a different observation characterizing a different state of the environment.

FIG. 3 also illustrates that the agent control system learns a higher-order graph model 320. When learning the higher-order graph model 320, the agent control system additionally accounts for aliased observations. Aliasing means that multiple distinct states of the environment may have the same observation (e.g., due to noisy or incomplete sensor measurement of the environment), making it difficult to know which exact state the agent is in. The higher-order graph model 320 thus extends beyond the first-order graph model 310 in that the higher-order graph model 320 can include multiple nodes that all represent the same observation of the environment.

Returning to FIG. 1, which illustrates that the agent control system 100 uses experience data 110 as training data to generate, e.g., train, the graph model 130. The experience data 110 is generated as a result of controlling the agent 102 to interact with the environment 104. The experience data 110 includes data defining multiple sequences of actions selected from a possible set of actions, with each action being performed in response to receiving a respective observation characterizing a respective state of the environment.

When the environment 104 is a complex environment with challenging topology (that has many different states, as well as stochastic transition probabilities between these different states), learning such a graph model 130 requires a large amount of experience data 110 that is generated as a result of extensive interaction of the agent 102 with the environment 104. That is, in order to learn a graph model 130 that accurately represents the environment 104, a very large number of actions 106 need to be repeatedly performed by the agent 102 in response to various different observations 108 of the environment 104.

The extensive interaction between the agent and the environment is both time intensive and consumes a significant amount of computational and energy resources. When the environment 104 is a real-world environment, and the agent 102 is a real-world agent, this extensive interaction could also result in unnecessary wear and tear on and damage to the environment or agent.

Advantageously, as will be described further below, by using the environment exploration techniques to effectively search through the environment, the agent control system 100 can train the graph model 130 to accurately represent any of a range of environments, and can do so significantly faster than traditional environment exploration schemes.

In particular, at each of multiple iterations of the environment exploration step, the agent control system 100 determines one or more planned actions such that, once performed by the agent, they can maximize an information gain of the graph model 130. The sequence of one or more planned actions can improve the accuracy of the graph model 130 in a reduced number of actions relative to other action selection techniques, e.g., including random walk-based techniques (that select the actions with some measure of randomness) and distance-based techniques (that select the planned actions based on distance measures between the nodes in the graph model connected by the edges representing the planned actions).

By using the environment exploration techniques described in this specification, the agent control system 100 can therefore learn the graph model 130 with reduced consumption of computational and energy resources.

Figure 4:
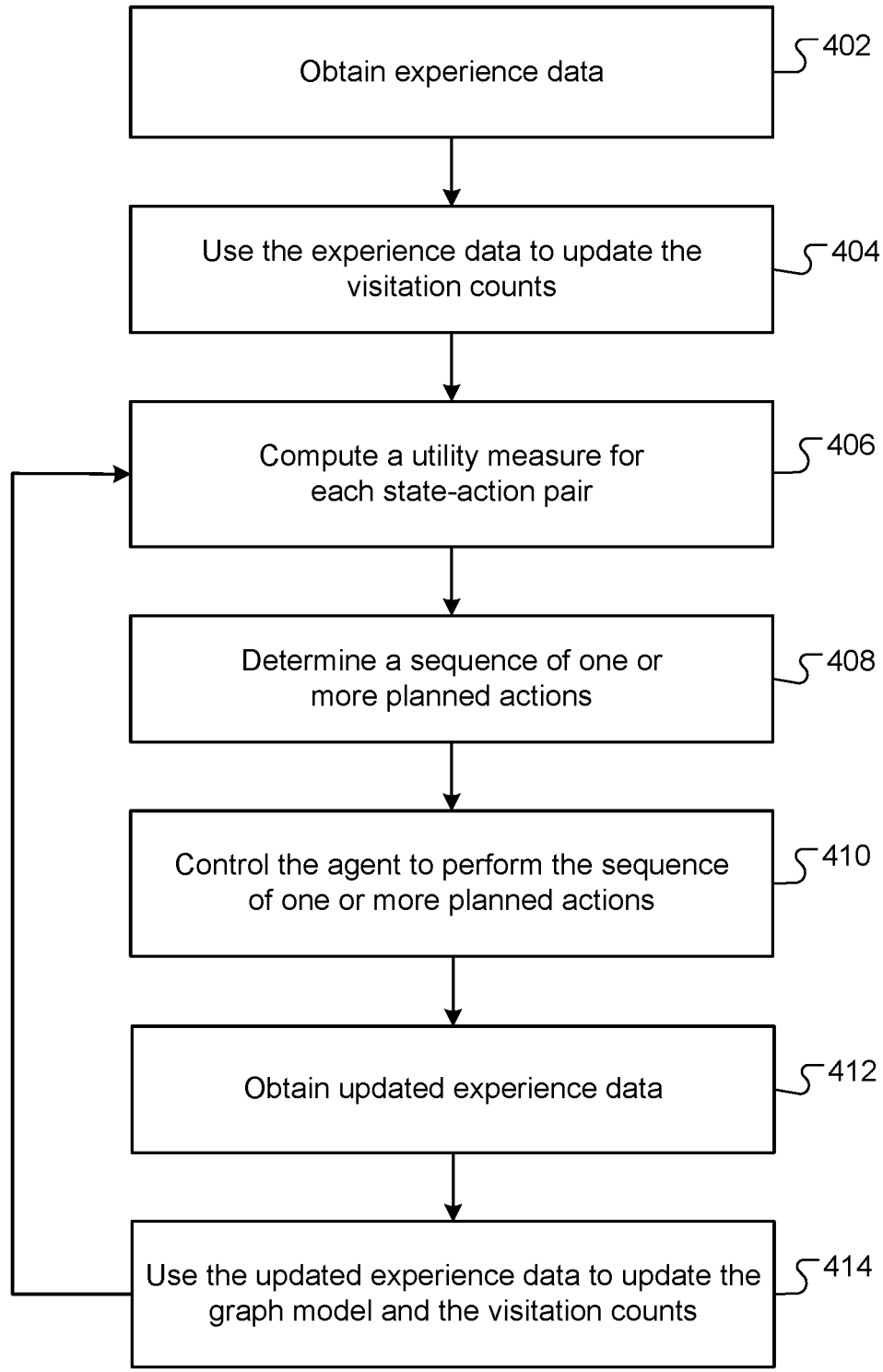
FIG. 4 is a flow chart of an example process for generating a graph model.

FIG. 4 is a flow chart an example process 400 for generating a graph model. For convenience, the process 400 will be described as being performed by a system of one or more computers located in one or more locations. For example, an agent control system, e.g., the agent control system 100 of FIG. 1, appropriately programmed in accordance with this specification, can perform the process 400.

As described above, the graph model can represent an environment being interacted with by an agent. The graph model can include nodes that represent states of the environment and edges connecting the nodes. An edge between a first node and a second node in the graph model can represent a corresponding action performed by the agent which caused the environment to transition from a state represented by the first node into a state represented by the second node.

The edge between the first node and the second node in the graph model is associated with an action-conditioned transition probability, which defines a likelihood of the state represented by the first state transitioning into the state represented by the second node, provided that the corresponding action represented by the edge is performed by the agent when the environment is in the state represented by the first node.

The system obtains experience data generated as a result of controlling the agent to interact with the environment by performing a sequence of one or more actions (step 402). Each action was performed in response to receiving a respective observation characterizing a respective state of the environment.

The sequences of actions can be selected from a possible set of actions in accordance with any of a variety of known action selection policies, e.g., a random policy, or a fixed policy that selects the actions according to predefined logic. In other words, the sequence of one or more actions may for example include one or more randomly selected actions from the possible set of actions.

The system uses the experience data to update a visitation count for each of one or more state-action pairs represented by the graph model (step 404). Each state-action pair includes a state, which corresponds to a node included in the graph model, and an action, which corresponds to an outgoing edge of the node included in the graph model.

The updated visitation count for a given state-action pair is the total number of times that a given state in the given state-action pair has been visited (and, analogously, a given action in the given state-action pair has been performed) during the interaction of the agent with the environment. Prior to obtaining the experience data, the visitation count can for example be initialized to zero for each state-action pair.

The system computes a utility measure for each of the one or more state-action pairs represented by the graph model (step 406). To compute the utility measure, the system evaluates a closed form utility function using at least the updated visitation counts. In many cases, the evaluation of closed form solutions not only improves accuracy but also reduces computational cost when compared with sampling approximation.

A closed form is an expression that can be computed by applying a finite number of standard or otherwise known operations to the arguments (i.e., function inputs). For example, the expression $$u(z,a) = JSD\{P(z'|z,z,T)|T \sim p(T)\} \quad (1)$$

does not have a closed form. This expression evaluates the utility measure of the state-action pair u(z, a) as the disagreement, in terms of Jensen-Shannon divergence, among the next-state distributions given the states z and the actions a of all possible transition functions weighted by their probabilities. This expression does not have a closed form because to compute the Jensen-Shannon divergence among the (infinitely many) distributions P(z'|z, a, T) it requires a sampling approximation from p(T).

In contrast, the following expression which evaluates the utility measure of the state-action pair u(z, a) has a closed form $$u(z, a) = JSD\{P(z'|z, a, t_{za})|t_{za} \sim Dir(b_{za})\} = \quad (2)$$
$$H\big(\mathbb{E}_{t_{za} \sim Dir(b_{za})}[t_{za}]\big) - \mathbb{E}_{t_{za} \sim Dir(b_{za})}[H(t_{za})] =$$
$$H\left(\frac{b_{za}}{1^\top b_{za}}\right) + \left(\frac{1^\top (b_{za} \odot \psi(b_{za} + 1))}{1^\top b_{za}}\right) - \psi(1^\top b_{za} + 1),$$

where t is the action-conditioned transition distribution P(z'|z, a), b is a vector that parameterizes the K+1 dimensional Dirichlet distribution over t (assuming K+1 states $z_{0:K}$), and $1^T$ is a row vector of ones of the appropriate length.

Evaluating Equation (2) thus involves determining a parameter vector b from the updated visitation counts and a Dirichlet prior parameter, and determining a Dirichlet distribution (parameterized by the parameter vector b) over the action-conditioned transition distribution t of the graph model. The action-conditioned transition distribution t defines a probability of the environment transitioning from the state represented by the first node into the state represented by the second node given that the corresponding action represented by the edge is performed by the agent.

Evaluating Equation (2) also involves evaluating an entropy function H(•) using the parameter vector b.

For a particular action-conditioned transition distribution t, the entropy H(t) can be computed as:

$$H(t) = -\sum_{i=0}^{K} t_i \log t_i.$$

Evaluating Equation (2) further involves evaluating a polygamma function ψ(•) using the parameter vector b to determine a polygamma function output, and determining an elementwise product between the parameter vector b and the polygamma function output.

A polygamma function of order in is a meromorphic function on z (a real or complex number) defined as the (m+1)th derivative of the logarithm of the gamma function:

$$\psi^{(m)}(z+1) \equiv \frac{d^{m+1}}{dz^{m+1}} \ln \Gamma(z+1) = (-1)^{m+1} m! \sum_{n=1}^{\infty} \frac{1}{(z+n)^{m+1}},$$

$m = 1, 2, 3, \ldots$

Equation (2) has a closed form because the entropy function term H(•), the elementwise product term ⊙, and the polygamma function term ψ(•) can each be computed by applying a fixed number of mathematical operations on respective arguments including or derived from the vector b that parameterizes the Dirichlet distribution.

The system determines, based on the utility measures, a sequence of one or more planned actions that have an information gain that satisfies a threshold (step 408). For a given state-action pair, its utility measure may be viewed as a one-step information gain for the given state-action pair. Thus, for example, the system can determine a sequence of one or more planned actions that have a highest combination, e.g., sum or average, of information gain among the information gain combinations of all sequences of state-action pairs represented by the graph model that begin from the same origination state (e.g., begin from a state characterized by a last observation received after a last action in the experience data). As another example, the system can determine a sequence of one or more planned actions that have a combination of information gain that is greater than a given value.

In some implementations, only one action is determined in step 408. The system can for example select, from all state-action pairs represented by the graph model that includes a state characterized by the last observation received by the agent in response to performing the last action in the experience data, a selected state-action pair that has a highest utility measure. The system then uses an action included in the selected state-action pair as the one single planned action.

In other implementations, multiple actions are determined in step 408. The system can for example use a reinforcement learning technique to generate an action selection policy for the state characterized by the last observation. The system then uses the action selection policy to select a sequence of multiple planned actions one after another to cause the environment to transition, from a state characterized by a last observation received after the last action in the experience data, into a different state.

For example, the reinforcement learning technique can be a value iteration technique or policy iteration technique that maximizes a time-discounted total reward computed from the utility measure of each of the multiple actions selected by the action selection policy.

The system controls the agent to interact with, or more precisely, actively explore the environment by performing the sequence of one or more planned actions (step 410). The performance of the sequence of one or more planned actions will generally cause the environment to transition, from a state characterized by a last observation received after a last action in the experience data, into a different state.

The system obtains updated experience data generated as a result of controlling the agent to perform the sequence of one or more planned actions (step 412).

The system uses the updated experience data to update the graph model (step 414). Specifically, the system updates the graph model to ensure that the updated graph model includes (i) one or more nodes that represent the respective states of the environment that have been visited by the agent during the interaction with the environment, and (ii) one or more edges between the nodes that represent the one or more actions that have been performed by the agent during the interaction, which caused the environment to transition between the respective states.

For example, the system can do this by adding to the graph model a new node for each different visited state (and, analogously, a new edge for each different performed action), or by removing existing nodes or edges that are determined to be redundant according to the updated experience data.

Updating the graph model also involves determining a respective action-conditioned transition probability of the edge between each different pair of nodes included in the graph model. For example, when the graph model is a higher-order graph model, e.g., a cloned hidden Markov model (CHMM) or a clone structured cognitive graph (CSCG) model, the system can determine the action-conditioned transition probability of the edge between each different pair of nodes included in the graph model based on the experience data, and on using an Expectation-Maximization (EM) algorithm (described in more detail in the Dileep George, et al. reference mentioned above), an online EM algorithm, or a Memorize-Generalize algorithm.

Moreover, because such a higher-order graph model generally includes two or more nodes in two or more clones of the graph model that can represent a same observation of the environment, the system can use a Viterbi algorithm or another maximum likelihood estimation algorithm to update the graph model by removing redundant clones of the graph model based on the experience data.

At step 414, the system also uses the updated experience data to update the visitation count for each of one or more state-action pairs represented by the graph model. That is, the system increments counts of visited states and performed actions by the agent in accordance with the update experience data.

After step 414, the system can determine whether the termination criteria have been satisfied. For example, the system can determine whether a threshold amount of wall clock time has elapsed, or whether a threshold number of iterations of steps 406-414 have been performed. If the system determines that the termination criteria have not been satisfied, the system loops back to step 406 to continue to perform another iteration of steps 406-414. Alternatively, if the system determines that the termination criteria have been satisfied, the system terminates the process 400 and outputs data specifying the final graph model that is generated after the last iteration of steps 406-414.

An example algorithm for performing multiple iterations of an environment exploration step to generate a graph model is shown below. The example algorithm can be used to generate a Clone Structured Cognitive Graph (CSCG) model that includes multiple clones.

| Algorithm 1 Efficient exploration (eFeX) for aliased latent graph recovery |
|---|

Input Discount factor $\gamma$, Dirichlet prior $\alpha$, clone allocation E of size $n_E \times n_H$, number of exploration steps N.
Output Latent graph in tensor format T.
  1: $\mathcal{D}_0 \leftarrow (x_1,)$ {Init sequence of observations}
  2: $v \leftarrow U[0, 1]^{n_H}$ {Init all $n_H$ entries randomly between 0 and 1}
  3: $\hat{z}_1 \leftarrow$ choice($C(x_1)$) {Init $z_1$ to a random clone of $x_1$}
  4: $c_{az} \leftarrow 0, \forall_{az}$ {Init $c_{az}$ to a vector of $n_H$ zeros}
  5: for n in 1, ..., N do
  6:   $b_{az} \leftarrow c_{az} + \alpha, \forall_{az}$
  7:   $u(z, a) =$ utility($b_{az}$), $\forall_{az}$ {Compute utility using (2)}
  8:   $\bar{t}_{az} \leftarrow b_{az}/1^T b_{az}, \forall_{az}$ {Compute mean transition tensor}
  9:   repeat
 10:     for z in 1, ..., $n_H$ do
 11:       $[v]_z \leftarrow \max_a \bar{t}_{az}^T((1 - \gamma)u(z, a) + \gamma v)$ {Run value-iteration}
 12:     end for
 13:   until convergence of v
 14:   $[\pi]_z = \arg \max_a \bar{t}_{az}^T((1 - \gamma)u(z, a) + \gamma v)$ {Recover optimal policy $\pi$}
 15:   $a_n \leftarrow [\pi]_{\hat{z}_n}$
 16:   $x_{n+1} \leftarrow$ Execute($a_n$) {Take approximate best action, receive observation}
 17:   $\mathcal{D}_n \leftarrow \mathcal{D}_{n-1} \cup (a_n, x_{n+1})$ {Grow sequence of observations}
 18:   Use EM + Viterbi training to obtain the transition tensor T from $\mathcal{D}_n$ (with pseudocount $\alpha$)
 19:   Use Viterbi with T and E on $\mathcal{D}_n$ to obtain a decoding $\hat{z}_1, \ldots, \hat{z}_{n+1}$
 20:   Use $\hat{z}_1, a_1 \ldots, a_n, \hat{z}_{n+1}$ to comoute $c_{az}, \forall_{az}$
 21: end for where $c_{az}$, $\forall az$ represents the visitation count vector, $x1, \ldots, xN$ represent the sequence of observations, $\hat{z}_1, \ldots, \hat{z}_N$ represent the estimated sequence of hidden states, t is the action-conditioned transition distribution, b is a vector that parameterizes the K+1 dimensional Dirichlet distribution over t (assuming K+1 states $z_{0:K}$), and $1^T$ is a row vector of ones of the appropriate length.

Once generated, the graph model can be used by the system or another system for a variety of purposes. For example, the graph model can be used in an agent control system that controls an agent interacting with the environment.

Figure 5:
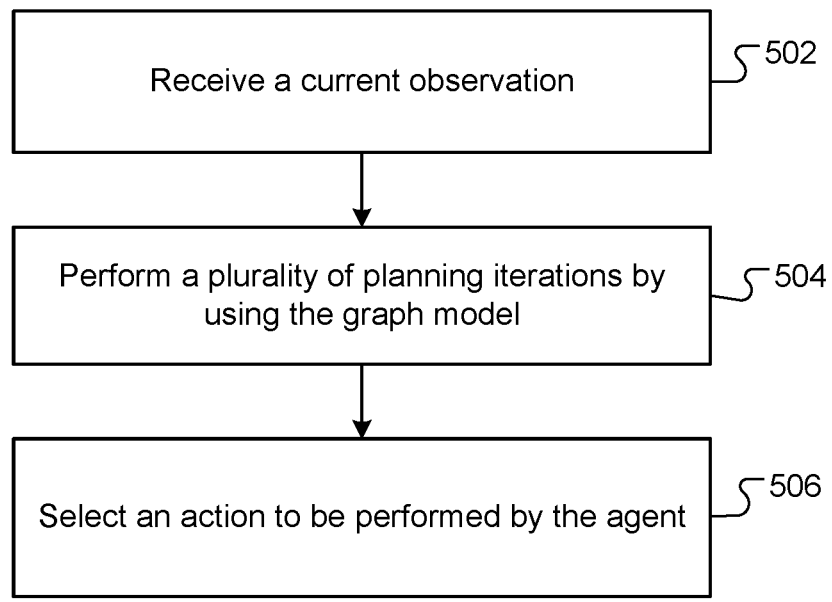
FIG. 5 is a flow chart of an example process for using the graph model of FIG. 4.

FIG. 5 is a flow chart of an example process 500 for using the graph model of FIG. 4. For convenience, the process 500 will be described as being performed by a system of one or more computers located in one or more locations. For example, an agent control system, e.g., the agent control system 100 of FIG. 1, appropriately programmed in accordance with this specification, can perform the process 500.

The system can repeatedly perform process 500 at each of multiple time steps (referred to as a "current" time step below) to select, from a possible set of actions, actions to be performed by an agent interacting with an environment to cause the agent to perform a task.

The system receives a current observation characterizing a current state of the environment at the current time step (step 502). For example, the observation can include an audio data segment, an image, a sentence in a natural language, or the like.

The system performs a plurality of planning iterations to generate plan data by using the graph model (step 504). Each planning iteration will generally begin from the current state of the environment, and end at a future state of the environment. To perform the plurality of planning iterations, the system can execute any of a variety of graph planning algorithms using data made available by the graph model. The plan data generally includes the results of each planning iteration, e.g., can be indicative of an estimated total reward to be received by the agent in response to performing each of multiple actions from the possible set of actions in the environment and starting from the current state.

The system selects an action to be performed by the agent in response to the current observation using the plan data (step 506). For example, the system can select, for performance by the agent at the current time step, an action that maximizes the estimated total reward received by the system according to the plan data.

Figure 6:
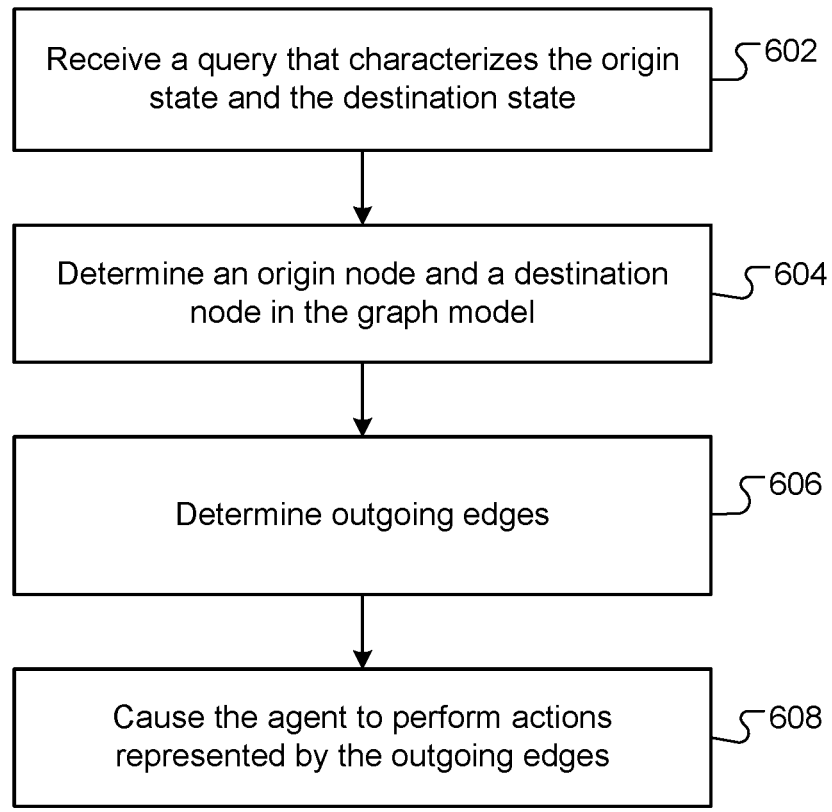
FIG. 6 is a flow chart of another example process for using the graph model of FIG. 4.

FIG. 6 is a flow chart of another example process 600 for using the graph model of FIG. 4. For convenience, the process 600 will be described as being performed by a system of one or more computers located in one or more locations. For example, an agent control system, e.g., the agent control system 100 of FIG. 1, appropriately programmed in accordance with this specification, can perform the process 600.

The system can perform process 600 to control an agent interacting with an environment to perform a sequence of one or more actions to cause the environment to transition from an origin state to a destination state.

The system obtains, i.e., receives or generates, a query that characterizes the origin state and the destination state (step 602). For example, the query can identify recent experience data generated as a result of controlling the agent to interact with the environment. The recent experience data includes a first observation characterizing the origin state, and a second observation characterizing the destination state. Each observation can for example include an audio data segment, an image, a sentence in a natural language, or the like.

The system determines, based on the graph model and the recent experience data, an origin node in the graph model that represents the origin state of the environment and a destination node in the graph model that represents the destination state (step 604).

The system determines a sequence of outgoing edges between the origin node and the destination node in the graph model (step 606). The sequence of edges includes edges that connect the intermediate nodes between the origin node and the destination node in the graph model. Thus, the first edge in the sequence of edges is the outgoing edge of the origin node in the graph model, and the last edge is the outgoing edge of the last intermediate node before the destination node in the graph model.

The system causes the agent to perform actions represented by the sequence of outgoing edges starting from the origin state (step 608), for example by instructing the agent to perform the actions or passing a control signal to a control system for the agent.

A few ways of controlling an agent using the graph model have now been described. Because the graph model can generalize well to represent any environment, and to any task that involves interacting with the environment, it will be appreciated that the graph model can be used in a wider range of technical applications.

For example, the described environment exploration techniques can be used to learn a graph model for use in simultaneous localization and mapping (SLAM) tasks. Compared with existing SLAM algorithms, the graph model is a more general approach, since it does not require observations to be related to the topology, and works for arbitrary topologies, instead of relying on the geometry of 2D or 3D environments. With the graph model, the accuracy and robustness of tracking a location of the objects within the environment can be improved.

As another example, learning a graph model of the environment enables advanced capabilities in agent control, including dynamic modification, transfer learning, and tagging. More specifically, in dynamic modification, agents can dynamically modify the graph model, marking newly blocked edges as unavailable and being able to replan through a different route. In transfer learning, an agent control algorithm can reuse common portions of a learned graph model to learn to control an agent faster when applied to a new environment. In tagging, an agent can tag nodes included in the graph model with specific dynamic information, for instance, where the agent has placed an object that will be needed later.

Figure 7:
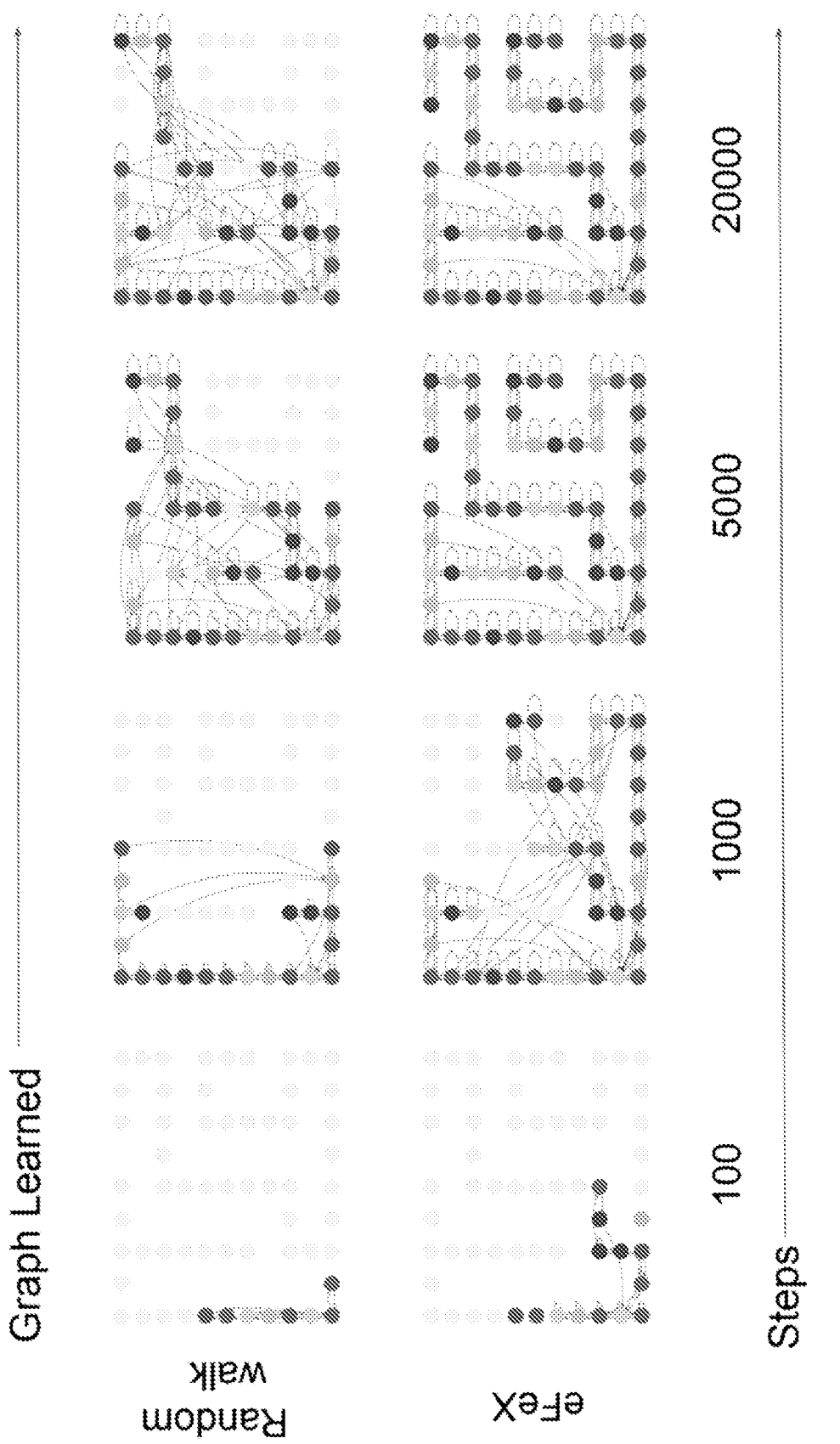
FIG. 7 shows a quantitative example of the performance gains that can be achieved by using the environment exploration techniques described in this specification to generate a graph model.

FIG. 7 shows a quantitative example of the performance gains that can be achieved by using the environment exploration techniques described in this specification to generate a graph model. The darker, filled circles in FIG. 7 represent nodes that have already been included in the graph model which represent the visited states of an environment. The unfilled circles in FIG. 7 represent nodes that have yet to be added to the graph model which represent the unvisited states of an environment. Generally, the more nodes included in the graph model, the more accurate the graph model is in terms of representing the environment. It can be appreciated that, with a same, fixed number of steps performed by the agent to interact with the environment, a graph model having a larger number of nodes can be generated by using the environment exploration techniques ("eFeX") described in this specification than using random walk techniques.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework or a JAX framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of generating a graph model representing an environment being interacted with by an agent, wherein the graph model comprises nodes that represent states of the environment and edges connecting the nodes, wherein an edge between a first node and a second node in the graph model represents a corresponding action performed by the agent which caused the environment to transition from a state represented by the first node into a state represented by the second node, wherein the method comprises:

obtaining experience data generated as a result of controlling the agent to perform a sequence of one or more actions from a possible set of actions, each action being performed in response to receiving a respective observation characterizing a respective state of the environment;

using the experience data to update a visitation count for each of one or more state-action pairs represented by the graph model, wherein each state-action pair corresponds to a node and an outgoing edge of the node included in the graph model; and at each of multiple environment exploration steps:
computing a utility measure for each of the one or more state-action pairs represented by the graph model, wherein computing the utility measure comprises evaluating a closed form utility function using at least the updated visitation counts;
determining, based on the utility measures, a sequence of one or more planned actions that have an information gain that satisfies a threshold; and
controlling the agent to perform the sequence of one or more planned actions to cause the environment to transition from a state characterized by a last observation received after a last action in the experience data into a different state.

2. The method of claim 1, wherein evaluating the closed form utility function comprises:
determining a parameter vector from the updated visitation counts and a Dirichlet prior parameter; and
determining a Dirichlet distribution parameterized by the parameter vector over an action-conditioned transition distribution of the graph model, wherein the action-conditioned transition distribution defines a probability of the environment transitioning from the state represented by the first node into the state represented by the second node given that the corresponding action represented by the edge is performed by the agent.

3. The method of claim 2, wherein evaluating the closed form utility function comprises evaluating an entropy function using the parameter vector.

4. The method of claim 2, wherein evaluating the closed form utility function comprises:
evaluating a polygamma function using the parameter vector to determine a polygamma function output; and
determining an elementwise product between the parameter vector and the polygamma function output.

5. The method of claim 1, wherein determining the sequence of one or more planned actions comprises:
selecting, from all state-action pairs represented by the graph model that includes a node representing the state characterized by the last observation, a selected state-action pair that has a highest utility measure; and
using an action included in the selected state-action pair as one single planned action.

6. The method of claim 1, wherein determining the sequence of one or more planned actions comprises:
using a reinforcement learning technique to generate an action selection policy for the node representing the state characterized by the last observation; and
using the action selection policy to select a sequence of multiple planned actions.

7. The method of claim 6, wherein the reinforcement learning technique comprises a value iteration technique that maximizes a total utility measure of actions selected by the action selection policy.

8. The method of claim 1, further comprising, at each of multiple environment exploration steps:
obtaining updated experience data generated as a result of controlling the agent to perform the sequence of one or more planned actions; and
using the updated experience data to update the visitation count for each of one or more state-action pairs represented by the graph model.

9. The method of claim 1, wherein the information gain of the sequence of one or more planned actions comprises a combination of utility measures of the planned actions included in the sequence.

10. The method of claim 1, wherein two or more nodes in the graph model represent a same observation of the environment.

11. The method of claim 1, further comprising, at each of the multiple environment exploration steps:
using the experience data to update the graph model to include (i) a plurality of nodes that represent the respective states of the environment and (ii) one or more edges between the plurality of nodes that represent the one or more actions performed by the agent which caused the environment to transition between the respective states.

12. The method of claim 11, wherein updating the graph model comprises updating the graph model based on using one of Expectation-Maximization (EM) algorithm, online EM algorithm, or Memorize-Generalize algorithm.

13. The method of claim 11, wherein the graph model comprises a clone structured cognitive graph (CSCG) model.

14. The method of claim 11, further comprising using a Viterbi algorithm to remove redundant clones of the graph model based on the experience data.

15. The method of claim 1, wherein the sequence of one or more actions comprise one or more randomly selected actions from the possible set of actions.

16. The method of claim 1, further comprising using the graph model to select, from a possible set of actions, actions to be performed by an agent interacting with an environment to cause the agent to perform a task, the selecting comprising:
receiving a current observation characterizing a current state of the environment;
performing a plurality of planning iterations to generate plan data by using the graph model, the plan data indicative of an estimated total reward to be received by the agent in response to performing each of multiple actions from the possible set of actions in the environment and starting from the current state; and
selecting an action to be performed by the agent in response to the current observation using the plan data.

17. The method of claim 1, further comprising using the graph model to control an agent interacting with an environment to perform a sequence of one or more actions to cause the environment to transition from an origin state to a destination state, the controlling comprising:
obtaining a query that characterizes the origin state and the destination state;
determining an origin node in the graph model that represents the origin state of the environment and a destination node in the graph model that represents the destination state;

determining a respective outgoing edge of the origin node and each intermediate node between the origin node and the destination node; and causing the agent to perform actions represented by the respective outgoing edges starting from the origin state.

18. The method of claim 17, wherein the query identifies recent experience data generated as a result of controlling the agent to interact with the environment, and wherein determining the origin node in the graph model that represents the origin state of the environment and the destination node in the graph model that represents the destination state comprises:

identifying the origin node based on the graph model and the recent experience data.

19. A system comprising one or more data processing apparatuses and one or more storage devices storing instructions that are operable, when executed by the one or more data processing apparatuses, to cause the one or more data processing apparatuses to perform operations for generating a graph model representing an environment being interacted with by an agent, wherein the graph model comprises nodes that represent states of the environment and edges connecting the nodes, wherein an edge between a first node and a second node in the graph model represents a corresponding action performed by the agent which caused the environment to transition from a state represented by the first node into a state represented by the second node, wherein the operations comprise:

obtaining experience data generated as a result of controlling the agent to perform a sequence of one or more actions from a possible set of actions, each action being performed in response to receiving a respective observation characterizing a respective state of the environment;

using the experience data to update a visitation count for each of one or more state-action pairs represented by the graph model, wherein each state-action pair corresponds to a node and an outgoing edge of the node included in the graph model; and at each of multiple environment exploration steps:
computing a utility measure for each of the one or more state-action pairs represented by the graph model, wherein computing the utility measure comprises evaluating a closed form utility function using at least the updated visitation counts;

determining, based on the utility measures, a sequence of one or more planned actions that have an information gain that satisfies a threshold; and controlling the agent to perform the sequence of one or more planned actions to cause the environment to transition from a state characterized by a last observation received after a last action in the experience data into a different state.

20. One or more non-transitory computer-readable media storing instructions that, when executed by one or more computers, cause the one or more computers to perform operations for generating a graph model representing an environment being interacted with by an agent, wherein the graph model comprises nodes that represent states of the environment and edges connecting the nodes, wherein an edge between a first node and a second node in the graph model represents a corresponding action performed by the agent which caused the environment to transition from a state represented by the first node into a state represented by the second node, wherein the operations comprise:

obtaining experience data generated as a result of controlling the agent to perform a sequence of one or more actions from a possible set of actions, each action being performed in response to receiving a respective observation characterizing a respective state of the environment;

using the experience data to update a visitation count for each of one or more state-action pairs represented by the graph model, wherein each state-action pair corresponds to a node and an outgoing edge of the node included in the graph model; and at each of multiple environment exploration steps:
computing a utility measure for each of the one or more state-action pairs represented by the graph model, wherein computing the utility measure comprises evaluating a closed form utility function using at least the updated visitation counts;

determining, based on the utility measures, a sequence of one or more planned actions that have an information gain that satisfies a threshold; and controlling the agent to perform the sequence of one or more planned actions to cause the environment to transition from a state characterized by a last observation received after a last action in the experience data into a different state.

* * * * *